United States Patent
Kliger et al.

(10) Patent No.: US 10,225,108 B2
(45) Date of Patent: Mar. 5, 2019

(54) CHANNEL ESTIMATION FOR MULTI-CHANNEL TRANSMISSIONS

(71) Applicant: Avago Technologies General IP (Singapore) Pte.Ltd., Singapore (SG)

(72) Inventors: Avraham Kliger, Ramat Gan (IL); Leo Montreuil, Duluth, GA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/373,343

(22) Filed: Dec. 8, 2016

(65) Prior Publication Data
US 2017/0163447 A1     Jun. 8, 2017

Related U.S. Application Data

(60) Provisional application No. 62/264,825, filed on Dec. 8, 2015, provisional application No. 62/267,213, filed on Dec. 14, 2015.

(51) Int. Cl.
*H04L 25/02* (2006.01)
*H04L 27/26* (2006.01)

(52) U.S. Cl.
CPC ...... *H04L 25/0204* (2013.01); *H04L 27/2614* (2013.01)

(58) Field of Classification Search
CPC .......................... H04L 27/2614; H04L 27/262
IPC .............................................. H04L 27/26,25/02
See application file for complete search history.

(56) References Cited

U.S. PATENT DOCUMENTS

| | | | | |
|---|---|---|---|---|
| 5,381,449 | A * | 1/1995 | Jasper | H04L 5/0048 332/103 |
| 8,102,925 | B2 * | 1/2012 | Shoemake | H04L 25/0226 375/260 |
| 8,571,000 | B2 * | 10/2013 | Zhou | H04L 27/2621 370/344 |
| 9,699,013 | B2 * | 7/2017 | Trojer | H04L 27/263 |
| 2006/0034378 | A1 * | 2/2006 | Lindskog | H04L 27/262 375/260 |

(Continued)

OTHER PUBLICATIONS

Hosokawa et al. "Pilot tone design for peak-to-average power ratio reduction in OFDM", Jul. 2005, IEEE, pp. 6014-6017.*

(Continued)

*Primary Examiner* — Sophia Vlahos
(74) *Attorney, Agent, or Firm* — Morgan, Lewis & Bockius LLP

(57) ABSTRACT

A device implementing a channel estimation for multi-channel transmissions system may include at least one processor configured to receive a set of signals over a set of channels, wherein each signal of the set of signals includes one of a set of channel estimation sequences. The set of channel estimation sequences may have been selected based at least in part on a signal quality metric, such as a peak-to-average power ratio, associated with a combination of the set of signals. The at least one processor may be further configured to perform a channel estimation for each channel based at least in part on the channel estimation sequence included in the signal received over each channel. In one or more implementations, the set of channel estimation sequences may be selected to minimize the signal quality metric associated with the combination of the plurality of channels.

18 Claims, 6 Drawing Sheets

(56) References Cited

U.S. PATENT DOCUMENTS

| | | | |
|---|---|---|---|
| 2006/0274868 A1* | 12/2006 | Chen | H04L 27/262 375/347 |
| 2006/0291431 A1* | 12/2006 | Pajukoski | H04L 27/2613 370/335 |
| 2007/0054681 A1* | 3/2007 | Suh | H04W 48/12 455/502 |
| 2010/0061403 A1* | 3/2010 | Mueller | H04L 27/2613 370/474 |
| 2013/0202060 A1* | 8/2013 | Nishikawa | H04L 27/04 375/300 |
| 2016/0309457 A1* | 10/2016 | Eitan | H04L 1/0079 |

OTHER PUBLICATIONS

Hu et al. "Peak Power Reduction for Pilot-Aided OFDM Systems with Semi-Blind Detection", Jul. 2012, IEEE, pp. 1056-1059.*
Garcia et al. "Peak Power Reduction for OFDM System with Orthogonal Pilot Sequences", Jan. 2006, IEEE, pp. 47-51.*

* cited by examiner

CE-Sequence on First Channel =

410 — [xxxx 0111 0100 1110 1011 1011 0011 1101 1011 0101 1010 0000 0111 1100 0011 1011
0000 0000 0010 1101 1001 0100 1111 1011 1011 1101 1110 1010 0101 1110 0001 1001
0011 1000 1010 1010 0000 0010 1001 0110 1111 1101 0111 0110 0101 1111 0101 1100
0101 1110 0001 1100 0110 0111 0100 1001 0111 1111 1011 1100 0000 xxxx xxxx xxxx
xxxx xxxx xxxx x011 1101 1000 1011 0010 0001 0000 0111 1010 1000 1001 0010 1000
1111 0000 1000 0011 0011 0111 0000 1001 0100 1011 0000 1000 1111 1011 0111 0111
1110 1001 1000 1110 1011 0101 0001 0000 0110 1101 0001 1111 1101 1010 0100 0101
0100 0001 0011 0111 1110 0011 1000 1010 1000 1001 0111 1100 1101 1010 1100 1xxx]

CE-Sequence on Second Channel =

420 — [xxxx 1001 1011 1001 0100 1010 1010 1111 1101 1001 0110 1001 1010 0001 0110 0011
0100 1000 0010 1111 1110 1101 1111 0101 0011 0010 0110 0001 1100 1001 1001 1111
0110 0110 1011 1000 1000 0011 0000 1010 1101 1011 1010 1011 0001 1101 0001 1001
1100 0001 0010 1010 0011 0111 0010 0010 0010 0001 1111 0100 0011 xxxx xxxx xxxx
xxxx xxxx xxxx x000 0111 0001 0001 0010 0100 1100 0110 1011 0101 0001 1011 0001
0011 1100 0001 0111 1111 1111 0100 1110 1100 1110 1011 0010 1010 1111 0001 0100
0110 0110 0111 0001 0110 0100 1001 1111 1101 1001 1101 0101 1100 0010 1111 0010
0011 0111 1111 0001 1101 0100 1000 0100 0011 1111 1001 0100 1010 1110 1110 1xxx]

CE-Sequence on Third Channel =

430 — [xxxx 1111 1010 0000 0111 0011 1111 1100 0011 0011 1011 0110 1011 1001 0011 1010
0001 1100 0011 0111 0000 1111 1001 1001 1111 1111 1010 1001 1010 0110 0100 0101
1011 0110 0101 1111 0110 1111 1101 1100 1101 1011 1001 0111 1011 1000 1001 0100
0000 0001 1001 1100 1001 0110 0101 1001 1110 1101 1000 1100 1101 xxxx xxxx xxxx
xxxx xxxx xxxx x001 0001 0011 0100 0101 0101 0110 0100 0001 0111 0011 0011 0010
0010 0011 1100 1110 0001 1011 0111 1111 0001 1100 1000 0110 1101 0101 0100 1001
1011 1001 1101 0101 0011 1110 1010 0010 0000 0011 1100 0100 1000 0100 0100 1011
0010 1000 0000 0110 0100 0011 1110 0000 0100 0010 0100 0010 1101 0000 0010 1xxx]

CE-Sequence on Fourth Channel =

440 — [xxxx 1001 1000 0010 0101 1111 1000 0010 1000 0001 0110 0111 0100 1100 0001 1100
1111 0110 0010 0111 0100 0011 1010 0001 1100 0010 1101 0101 0111 0010 1101 1100
0101 1010 0000 0001 1100 0010 0101 0011 0101 0011 1111 1001 1010 1101 0110 0101
0011 0110 0110 1100 0111 1010 1100 0110 0000 0100 1011 0100 1000 xxxx xxxx xxxx
xxxx xxxx xxxx x110 0111 1011 1001 1101 0100 0110 0111 0001 1101 1100 1010 1101
0000 1101 0001 0000 1111 0110 1000 0000 0010 0010 0100 0001 0110 0010 1100 0000
1010 0011 1011 0010 1001 0101 1101 1011 0011 1100 0110 0011 1111 0111 0000 1000
1001 1101 0101 0111 0101 0101 1010 1101 0110 1100 1100 1100 0110 0001 0100 1xxx]

CE-Sequence on Fifth Channel =

450 — [xxxx 0101 0000 1100 0111 0111 1111 0110 0000 0000 0010 1010 0010 1011 1100 0010
1101 0001 1110 1101 0011 0010 1111 1100 0010 0110 1101 1011 1001 1101 1100 1010
0110 0101 0011 0111 1101 1000 0110 0101 0011 0011 0100 1101 1000 1110 0000 0101
1001 1101 1000 0111 1000 0011 0100 1000 0001 1111 1110 0001 0011 xxxx xxxx xxxx
xxxx xxxx xxxx x100 1000 0001 1110 1010 1010 1010 1100 0101 0010 1000 0010 0000
1100 1010 1001 1001 1000 0110 0101 0001 0001 1100 0111 0110 1110 0001 1010 0110
0000 1010 0010 0101 0100 1000 0000 0100 0101 1001 1001 1001 1001 1100 1010 0100
1001 1100 1111 0000 1110 0010 0101 0000 1100 0010 1100 1110 1000 1000 0000 1xxx]

FIG. 4

CHANNEL ESTIMATION FOR MULTI-CHANNEL TRANSMISSIONS

CROSS-REFERENCE TO RELATED APPLICATIONS

The present application claims the benefit of U.S. Provisional Patent Application Ser. No. 62/264,825, entitled "Channel Estimation for Multi-Channel Transmissions," filed on Dec. 8, 2015, and the benefit of U.S. Provisional Patent Application Ser. No. 62/267,213, entitled "Channel Estimation for Multi-Channel Transmissions," filed on Dec. 14, 2015, both of which are hereby incorporated by reference in their entireties for all purposes.

TECHNICAL FIELD

The present description relates generally to channel estimation, including channel estimation for multi-channel transmissions.

BACKGROUND

A number of network devices, or network nodes, may communicate with one another over a communication channel. The signals communicated between the devices may include channel estimation sequences to facilitate the receiving network device with performing a channel estimation for the communication channel.

BRIEF DESCRIPTION OF THE DRAWINGS

Certain features of the subject technology are set forth in the appended claims. However, for purpose of explanation, several embodiments of the subject technology are set forth in the following figures.

FIG. 4 illustrates example channel estimation sequences in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
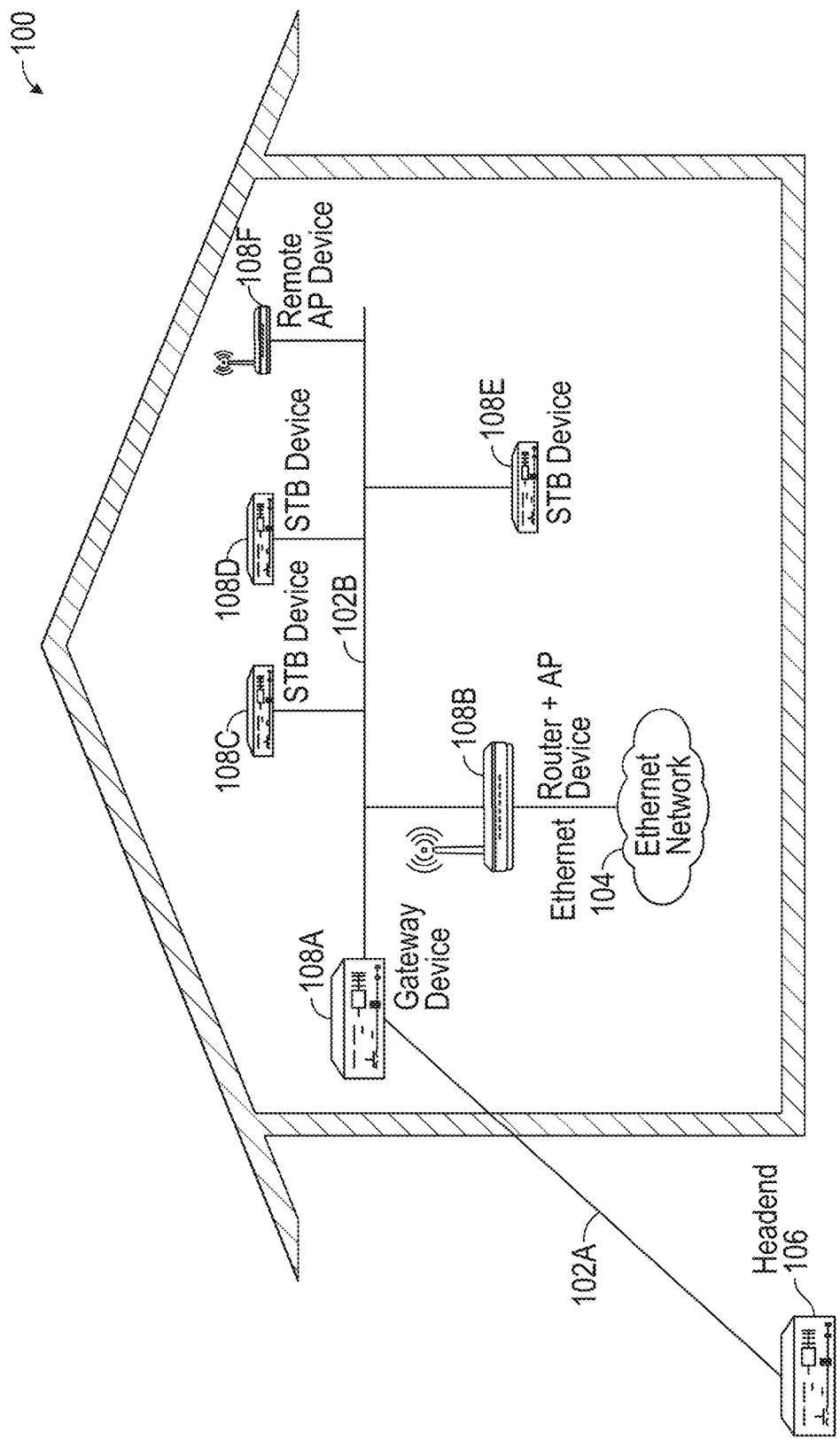
FIG. 1 illustrates an example network environment in which a channel estimation for multi-channel transmissions system may be implemented in accordance with one or more implementations.

FIG. 1 illustrates an example network environment 100 in which a channel estimation for multi-channel transmissions system may be implemented in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The network environment 100 includes a transmission medium 102A, a shared transmission medium 102B, a headend device 106, and one or more network devices 108A-F. In FIG. 1, the network device 108A is a gateway device, the network device 108B is a router device, the network devices 108C-E are set-top box devices, and the network device 108F is a wireless access point device. The network devices 108A-F communicate with each other over the shared transmission medium 102B, and the network device 108A communicates with the headend device 106 over the transmission medium 102A. The network device 108B and/or the network device 108F may support Wi-Fi transmissions, such as 8×8 multiple-input multiple-output (MIMO) transmissions with a data rate of up to, for example, 10 Gigabits per second (Gyps). One or more of the devices 106, 108A-F may be and/or may include all or part of the electronic system discussed below with respect to FIG. 6.

The transmission media 102A-B may include one or more of a coaxial transmission medium (e.g. for Multimedia over Coax Alliance (MoCA) transmissions), a powerline transmission medium, an Ethernet transmission medium, optical transmission medium, and/or one or more devices that facilitate communications over the transmission media 102A-B, such as splitters, diplexers, switches, etc. For example, the transmission medium 102A may include an optical transmission medium and the transmission medium 102B may include a coaxial transmission medium. In one or more implementations, the network device 108B may be further coupled to another network 104, e.g. an Ethernet network, via additional transmission media that is physically separate and/or physically different than the transmission media 102A-B. In one or more implementations, one or more of the transmission media 102A-B may be wireless transmission media.

In the network environment 100, one or more of the network devices 108A-F, such as the network device 108A, is designated as the network coordinator (NC) device for the network environment 100. For example, one or more of the network devices 108A-F may elect, or jointly decide which device will operate as the network coordinator device. The network coordinator device coordinates transmissions of the network devices 108A-F over the shared transmission medium 102B and coordinates admission of new network devices into the network environment 100. The transmissions of the network devices 108A-F over the shared transmission medium 102B may be temporally divided into time periods or time intervals which may be referred to as medium access plan (MAP) cycles.

For example, during a current MAP cycle the network devices 108A-F transmit bandwidth requests to the network coordinator device for bandwidth allocations during the subsequent MAP cycle. The network coordinator device allocates the bandwidth for the subsequent MAP cycle and transmits an indication of the bandwidth allocations to the devices network devices 108A-F over the shared transmission medium 102B during the current MAP cycle. The bandwidth allocations may be and/or may include, for example, orthogonal frequency-division multiple access (OFDMA) subcarrier allocations. The indication of the bandwidth allocations may be transmitted by the network coordinator device in a frame which may be referred to as a MAP frame and/or a resource allocation frame. The network devices 108A-F may then transmit data in the subsequent MAP cycle based on the bandwidth allocations indicated in the MAP frame.

The network device 108A is further coupled to the headend device 106 via the transmission medium 102A that is separate from the transmission medium 102B. The headend device 106 may include, for example, a video server that provides one or more audio and/or video streams to the network devices 108A-F. In the network environment 100, the network device 108A is in direct communication with the headend device 106, while the other network devices 108B-F communicate with the headend device 106 through the network device 108A. The headend device 106 may also couple the network device 108A (and indirectly the network devices 108B-F) to an external network, such as the Internet.

One or more of the network devices 108A-F, such as the network device 108A, may transmit signals to one or more other of the network devices, such as the network device 108B, over a single channel, and/or the network device 108A may concurrently transmit signals to the network device 108B over multiple channels, such as two channels, three channels, four channels, five channels, or any number of channels. The channels may be, for example, 100 Megahertz (MHz) channels, 200 Megahertz (MHz) channels, or generally channels having any bandwidth. The channels may be adjacent, contiguous, non-contiguous, overlapping, non-overlapping, and/or two or more of the channels may have different bandwidths. The transmissions may be, for example, OFDMA transmissions.

Data and/or probe signals transmitted by the network device 108A to the network device 108B may have a preamble that includes a channel estimation sequence. An example process for a transmitting network device in the subject system, such as the network device 108A, is discussed further below with respect to FIG. 2. The signals may be received by the network device 108B and the network device 108B may use the channel estimation sequences of the received signals to perform a channel estimation for the channel. An example process of a receiving device in the subject system, such as the network device 108B, is discussed further below with respect to FIG. 3. For example, the channel estimation sequence may be a sequence that is known a priori to both of the network devices 108A-B, and the network device 108B may perform the channel estimation based on a correlation between the received channel estimation sequence and the known channel estimation sequence. Thus, the channel estimation sequence may be a sequence that has strong correlation properties as well as a sequence that results in a low peak-to-average power ratio for the transmitted signal.

When the network devices 108A-B concurrently communicate over multiple channels, such as two or more channels, the use of the same channel estimation sequence for each channel may result in a high peak-to-average power ratio for the combination of the transmitted signals. The high peak-to-average power ratio may result in a lower channel estimation performance which may consequently result in degradation to the data/probe reception performance.

In the subject system, a different channel estimation sequence is selected for each channel over which concurrent transmissions will be performed such that the peak-to-average power ratio of the combination of the transmitted signals is minimized and/or is substantially reduced. The peak-to-average power ratio may be determined, for example, from a signal formed by an aggregation, or combination, of the transmitted signals. Example channel estimation sequences that minimize the peak-to-average power ratio for a combination of the signals transmitted over two, three, four, or five channels are discussed further below with respect to FIG. 4.

Figure 2:
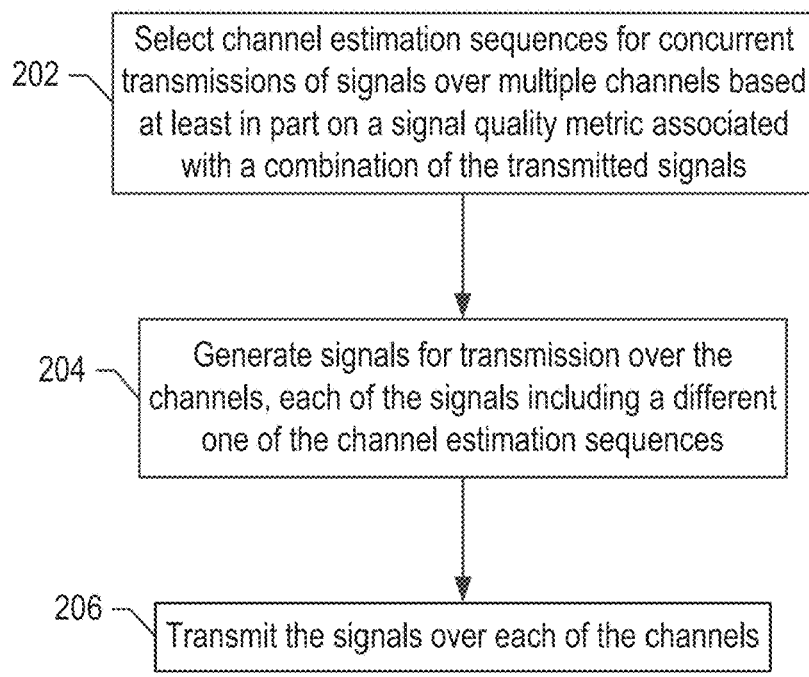
FIG. 2 illustrates a flow diagram of an example process of a transmitting device in accordance with one or more implementations.

FIG. 2 illustrates a flow diagram of an example process 200 of a transmitting device in accordance with one or more implementations. For explanatory purposes, the example process 200 is described herein with reference to the example network device 108A of the example network environment 100 of FIG. 1; however, the example process 200 is not limited to the example network device 108A of the example network environment 100 of FIG. 1. For example, the example process 200 may be performed by one or more of the other network devices 108B-F and/or the headend device 106 of the example network environment 100. Further for explanatory purposes, the blocks of the example process 200 are described herein as occurring in serial, or linearly. However, multiple blocks of the example process 200 may occur in parallel. In addition, the blocks of the example process 200 need not be performed in the order shown and/or one or more of the blocks of the example process 200 need not be performed.

The network device 108A selects channel estimation sequences for concurrent transmissions of signals over multiple channels based at least in part on a signal quality metric, such as peak-to-average power ratio, associated with a combination of the transmitted signals (202). For example, the network device 108A may select two or more of the channel estimation sequences that are discussed further below with respect to FIG. 4. In one or more implementations, the channel estimation sequences may be predetermined, e.g., based at least in part on a communication specification, protocol, and/or standard being implemented by the network device 108A, such as in association with the transmitted signals.

The network device 108A generates the signals for transmission over each of the channels where each of the signals includes a different one of the channel estimation sequences (204). For example, each of the signals may include a PHY preamble that is prepended before each transmitted PHY payload. The preamble may include one of the channel estimation sequences as well as one or more other reference signals that may be used by the receiving device to facilitate detecting and/or acquiring one or more physical layer parameters that may be used to properly decode the PHY frame, such as gain, timing information, and the like.

The preamble may include a short sequence, which may include 0 to 12 repetitions of a short symbol and may be useful in facilitating convergence of the receiving device's automatic gain control setting. The preamble may further include a long sequence, which may include 0, 4, or 8 repetitions of one or more different long symbols and may be useful in facilitating recovery by the receiving device of timing and frequency-offset information. The short symbol may be for example, 64 samples, or any number of samples, in duration, while the one or more different long symbols may be, for example, 128 samples, or any number of samples, in duration. In one or more implementations, the short symbol may have a shorter duration than one or more of the different long symbols.

The preamble may further include the channel estimation sequence selected for the channel (or one or more repetitions thereof) prepended by a single cyclic prefix, which may be useful in facilitating the receiving device in performing channel estimation and/or estimating inverse equalization factors. The single cyclic prefix may be, for example, 192 samples. In one or more implementations, the channel estimation sequence, and/or each repetition thereof, may be referred to as a channel estimation symbol.

The preamble may begin with the short sequence, followed by the long sequence, and ending with the channel estimation sequence (or one or more repetitions thereof) prepended with the single cyclic prefix. The preamble symbols/sequences may use the same modulation of the subcarriers that are used for the PHY payload, such as BPSK. However, the preamble transmission may only modulate the set of subcarriers that have been allocated to the network device 108A by the network coordinator device.

In one or more implementations, the type of signal associated with the preamble may indicate the number of repetitions of the short, long, and/or channel estimation symbols. For example, for probe PHY-frames, the preamble may include 12 repetitions of a short symbol, 8 repetitions of one of the long symbols, and 2 repetitions of a channel estimation symbol. For MAP, broadcast, and unicast messages, the preamble may include 0 repetitions of the short symbol, 4 repetitions of one of the long symbols, and 2 repetitions of the channel estimation symbol. For OFDMA PHY-frames, the preamble may include 0 repetitions of the short symbol, 0 repetitions of the long symbol, and 2 repetitions of the channel estimation symbol. For unicast high-speed PHY-frames, such as data-only frames, the preamble may include 0 repetitions of the short symbol, 0 repetitions of the long symbol, and 1 or 2 repetitions of the channel estimation symbol.

The channel estimation sequence for each channel may also have strong autocorrelation characteristics with regard to the respective prepended single cyclic prefixes. Thus, the channel estimation sequences may also be used for signal acquisition and/or setting the fast-Fourier transform boundaries. An example graph illustrating the strong autocorrelation characteristics of the sequences with regard to the respective prepended cyclic prefixes is discussed further below with respect to FIG. 4.

The network device 108A then transmits the generated signals over each of the channels, where each of the signals includes one of the channel estimation sequences (206). The peak-to-average power ratio measured for the combination of the transmitted signals may be minimized and/or substantially reduced relative to other channel estimation sequences.

Figure 3:
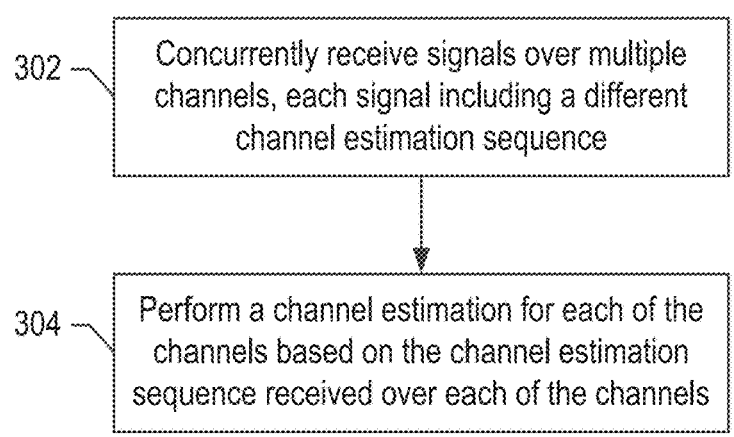
FIG. 3 illustrates a flow diagram of an example process of a receiving device in accordance with one or more implementations.

FIG. 3 illustrates a flow diagram of an example process 300 of a receiving device in accordance with one or more implementations. For explanatory purposes, the example process 300 is described herein with reference to the example network device 108B of the example network environment 100 of FIG. 1; however, the example process 300 is not limited to the example network device 108B of the example network environment 100 of FIG. 1. For example, the example process 300 may be performed by one or more of the other network devices 108A,C-F and/or the headend device 106 of the example network environment 100. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

The network device 108B concurrently receives signals over multiple channels where each of the signals includes a different channel estimation sequence (302). The channel estimation sequences may be selected by the transmitting device (and/or predetermined by a specification or standard) to minimize a signal quality metric, such as a peak-to-average power ratio, measured for a signal formed from a combination of the transmitted signals. The network device 108B may retrieve the channel estimation sequences from each received signal and may perform a channel estimation (and/or estimate inverse equalization factors) for each channel based at least in part on the retrieved channel estimation sequences (304).

FIG. 4 illustrates example channel estimation sequences 410-450 in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

FIG. 4 includes a first channel estimation sequence 410, a second channel estimation sequence 420, a third channel estimation sequence 430, a fourth channel estimation sequence 440, and a fifth channel estimation sequence 450. The channel estimation sequences 410-450 may also be referred to as channel estimation symbols 410-450. As shown in FIG. 4, the channel estimation sequences 410-450 are BPSK sequences specified in the frequency domain and are 512 samples in duration. The leftmost element of each of the channel estimation sequences 410-450 corresponds to subcarrier index number 0, and the rightmost element of each of the channel estimation sequences 410-450 corresponds to subcarrier index number 511.

In the channel estimation sequences 410-450, 0=BPSK constellation point $\{+1, 0\}$, 1=BPSK constellation point $\{-1,0\}$, and x=$\{0,0\}$ corresponds to unavailable subcarriers. The network devices 108A-F may also each modify the channel estimation sequences 410-450 by substituting x=$\{0, 0\}$ for each subcarrier that is not currently assigned by the network coordinator for use by each of the respective network devices 108A-F for the particular OFDMA PHY-frame. The channel estimation sequences 410-450 and/or the modified channel estimation sequences 410-450 may be transformed to a 512-sample time domain sequence using, for example, an inverse discrete Fourier transform. For all other preambles, the network devices 108A-F may modulate all available 480 subcarriers during the channel estimation sequences 410-450 for a given channel.

In one or more implementations, the inverse discrete Fourier transform may be determined for the $N_{FFT}$-point frequency domain symbol of X[n] (with N=$N_{FFT}$=512, and n represents the subcarrier index) as follows:

$$x[k] = \frac{1}{\sqrt{N}} \sum_{n=0}^{N-1} X[n] W_N^{-kn}, 0 \leq k \leq N-1$$

$$x[k] = 0, \text{otherwise}$$

$$W_N^{kn} = e^{-j2\pi kn/N}$$

When one or more of the network devices 108A-F, such as the network device 108A, is transmitting over five channels, the network device 108A may use, for example, the first channel estimation sequence 410 for the channel having the lowest frequency and may use each successive channel estimation sequence 420-440 for each successive higher frequency channel, with the fifth channel estimation sequence 450 being used for the channel having the highest frequency. However, the channel estimation sequences 410-450 may be used on any of the channels in any order.

When the network device 108A is transmitting over four channels, the network device 108A may use, for example, the first channel estimation sequence 410 for the channel having the lowest frequency and may use each successive channel estimation sequence 420-430 for each successive higher frequency channel, with the fourth channel estimation sequence 440 being used for the channel having the highest frequency. However, the channel estimation sequences 410-440 may be used on any of the channels in any order.

When the network device 108A is transmitting over three channels, the network device 108A may use, for example, the first channel estimation sequence 410 for the channel having the lowest frequency, the second channel estimation sequence 420 for the channel having the second lowest frequency, and the third channel estimation sequence 430 for the channel having the highest frequency. However, the channel estimation sequences 410-430 may be used on any of the channels in any order. In one or more implementations, the peak-to-average power ratio values for transmissions over five channels may include a complex envelope value of 6.4, and a real RF signal value of 9.3, the peak-to-average power ratio values for transmissions over four channels may include a complex envelope value of 6.5, and a real RF signal value of 9.3, and the peak-to-average power ratio values for transmissions over three channels may include a complex envelope value of 5.9, and a real RF signal value of 8.7.

Figure 5:
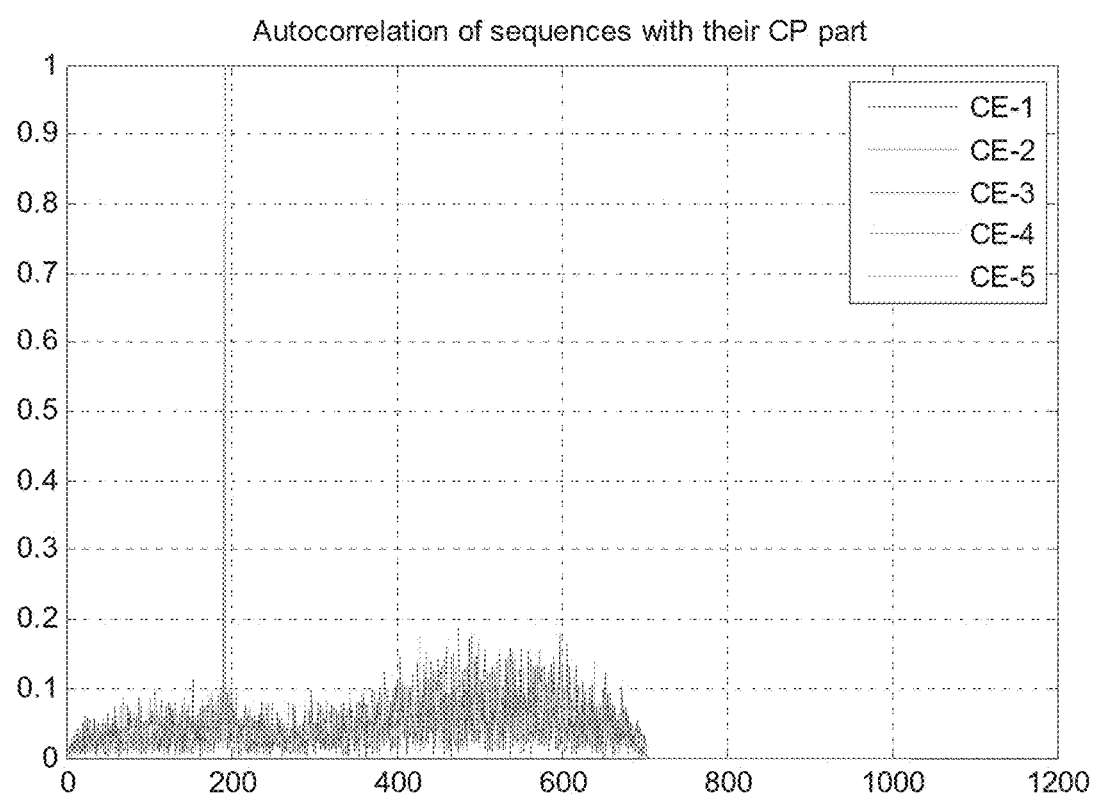
FIG. 5 illustrates a graph of example autocorrelations of channel estimation sequences with an associated cyclic prefix in accordance with one or more implementations.

FIG. 5 illustrates a graph 500 of example autocorrelations of channel estimation sequences with an associated cyclic prefix in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The graph 500 shows the performance of autocorrelating the channel estimation sequences 410-450 with their associated cyclic prefixes. As shown in the graph 500, the channel estimation sequences 410-450 each has good autocorrelation characteristics with respect to their associated cyclic prefixes.

Figure 6:
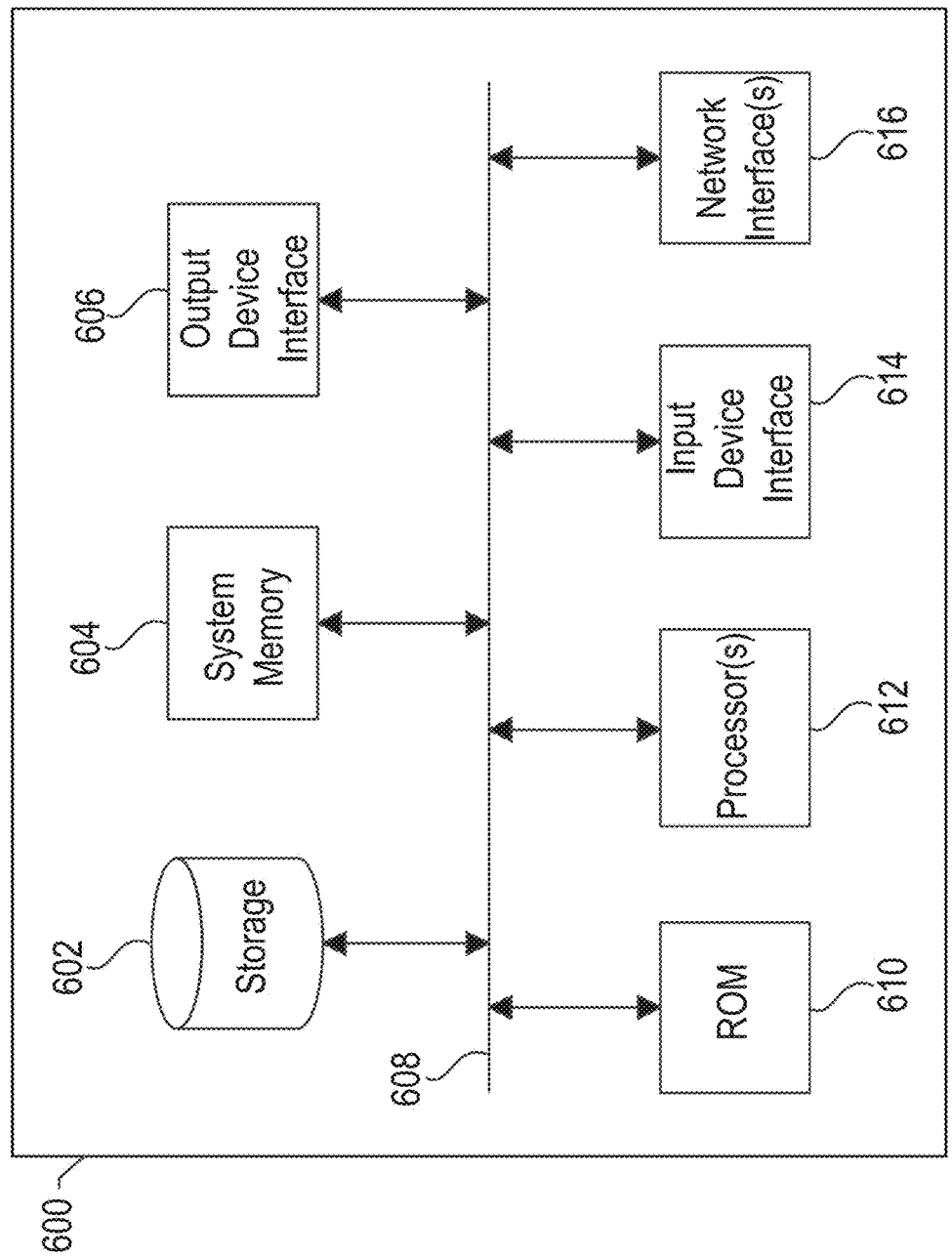
FIG. 6 conceptually illustrates an example electronic system with which one or more implementations of the subject technology can be implemented.

FIG. 6 conceptually illustrates an example of an electronic system 600 with which one or more implementations of the subject technology can be implemented. The electronic system 600, for example, may be, or may include, one or more of the devices 106, 108A-F, such as a desktop computer, a laptop computer, a tablet computer, a phone, a gateway device, a set-top-box, and/or generally any network device. Such an electronic system 600 includes various types of computer readable media and interfaces for various other types of computer readable media. The electronic system 600 includes a bus 608, one or more processing unit(s) 612, a system memory 604, a read-only memory (ROM) 610, a permanent storage device 602, an input device interface 614, an output device interface 606, one or more network interface(s) 616, and/or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are utilized by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive ay be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory (RAM). The system memory 604 may store one or more of the instructions and/or data that the one or more processing unit(s) 612 may utilize at runtime. In one or more implementations, the processes of the subject disclosure are stored in the system memory 604, the permanent storage device 602, and/or the ROM 610. From these various memory units, the one or more processing unit(s) 612 retrieve instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by the electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, such as a prism projector that may be included in a smart glasses device, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 6, bus 608 also couples electronic system 600 to one or more networks (not shown) through one or more network interface(s) 616. The one or more network interface(s) may include an Ethernet interface, a Wi-Fi interface, a Bluetooth interface, a ZigBee interface, a multimedia over coax alliance (Mocha) interface, a reduced gigabit media independent interface (RAMI), or generally any interface for connecting to a network. In this manner, electronic system 600 can be a part of one or more networks of computers (such as a local area network (LAN), a wide area network (WAN), or an Intranet, or a network of networks, such as the Internet. Any or all components of electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, (CRAM, SONGS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an network device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   selecting a plurality of channel estimation sequences for a plurality of channels based at least in part on a signal quality metric associated with a set of signals transmitted over the plurality of channels, each signal of the set of signals comprising one of the plurality of channel estimation sequences, the signal quality metric comprising a peak to average power ratio of the set of signals; and
   concurrently transmitting the set of signals over the plurality of channels, wherein at least one signal of the set of signals comprises a preamble, the preamble comprising a symbol sequence and one of the plurality of channel estimation sequences.

2. The method of claim 1, wherein each of the plurality of channel estimation sequences is different.

3. The method of claim 1, wherein the set of signals are concurrently transmitted over the plurality of channels.

4. The method of claim 1, wherein each of the plurality of channel estimation sequences is selected to minimize the peak to average power ratio of one or more sets of signals concurrently transmitted over the plurality of channels, the one or more sets of signals including the set of signals.

5. The method of claim 1, wherein a total number of channels in the plurality of channels comprises three, four, or five channels.

6. The method of claim 1, wherein the plurality of channel estimation sequences comprises a plurality of frequency domain sequences, and the method further comprises:
   transforming each of the plurality of frequency domain sequences to a time domain sequence.

7. The method of claim 6, wherein the transforming is performed using an inverse discrete Fourier transform.

8. The method of claim 1, wherein the symbol sequence comprises a short symbol sequence and a long symbol sequence.

9. The method of claim 8, wherein an end of the preamble comprises the one of the plurality of channel estimation sequences repeated a number of times.

10. The method of claim 8, wherein a cyclic prefix is prepended to the one of the plurality of channel estimation sequences in the preamble.

11. A computer program product comprising code stored in a non-transitory computer-readable storage medium, the code when executed by a processor causes the processor to perform operations, and the code comprising:
    code to cause the processor to concurrently receive a plurality of signals over a plurality of channels, wherein each of the plurality of signals comprises one of a plurality of channel estimation sequences and the plurality of channel estimation sequences having been selected based at least in part on a signal quality metric associated with a combination of the plurality of signals, wherein the signal quality metric associated with the combination of the plurality of signals comprises a peak to average power ratio of the combination of the plurality of signals; and
    code to cause the processor to perform a channel estimation for each of the plurality of channels based at least in part on the one of the plurality of channel estimation sequences of each of the plurality of signals received over each of the plurality of channels.

12. The computer program product of claim 11, the plurality of channel estimation sequences are selected to minimize the peak to average power ratio of the combination of the plurality of signals.

13. The computer program product of claim 11, wherein at least one signal of the plurality of signals comprises a preamble, the preamble comprising a short symbol sequence, a long symbol sequence, and one of the plurality of channel estimation sequences.

14. The computer program product of claim 13, wherein an end of the preamble comprises the one of the plurality of channel estimation sequences repeated a number of times.

15. A device comprising:
    a memory configured to store a plurality of channel estimation sequences, wherein each of the plurality of channel estimation sequences is selected to effect a signal quality metric associated with a set of signals transmitted over a plurality of channels, each signal of the set of signals comprising one of the plurality of channel estimation sequences; and
    at least one processor configured to concurrently transmit the set of signals over the plurality of channels, wherein at least one signal of the set of signals comprises a preamble, the preamble comprising a short symbol sequence, a long symbol sequence, and one of the plurality of channel estimation sequences.

16. The device of claim 15, wherein an end of the preamble comprises the one of the plurality of channel estimation sequences repeated a number of times.

17. The device of claim 15, wherein the signal quality metric associated with the set of signals transmitted over the plurality of channels comprises a peak to average power ratio of the set of signals transmitted over the plurality of channels.

18. The device of claim 17, wherein each of the plurality of channel estimation sequences is selected to minimize the peak to average power ratio of the set of signals transmitted over the plurality of channels.

* * * * *